United States Patent [19]

Hendricks

[11] 4,237,153
[45] Dec. 2, 1980

[54] METHOD OF STRIPPING AND REPAINTING ETHYLENE-PROPYLENE-NON-CONJUGATED-DIENE RUBBER PARTS

[75] Inventor: Ronald S. Hendricks, Ada, Okla.

[73] Assignee: The General Tire & Rubber Company, Akron, Ohio

[21] Appl. No.: 738,932

[22] Filed: Nov. 4, 1976

Related U.S. Application Data

[63] Continuation of Ser. No. 621,721, Oct. 14, 1975, abandoned.

[51] Int. Cl.$^2$ .......................... B08B 3/08; B08B 3/10
[52] U.S. Cl. ..................................... 427/140; 134/38; 156/98; 252/142; 252/173; 252/DIG. 8; 427/354
[58] Field of Search ............................. 134/38, 40, 42; 252/142, 143, 173, DIG. 8; 427/54, 140, 331, 337, 340, 352, 353, 354; 156/98

[56] References Cited

U.S. PATENT DOCUMENTS

| 1,553,485 | 9/1925 | Tennis | 252/DIG. 8 |
| 3,993,804 | 11/1976 | McCready et al. | 427/140 |

FOREIGN PATENT DOCUMENTS 7232 of 1905 United Kingdom ............. 252/DIG. 8

OTHER PUBLICATIONS

"Sno-Flake CS-73-M408", Amchem Products, Inc., Ambler, Pa., Dec. 1973.
"Cold Stripper Peels Urethane Paint from Rubber Surfaces", 1975.

Primary Examiner—Bruce H. Hess

[57] ABSTRACT

Ethylene-propylene-non-conjugated-diene rubber (EPDM) parts having a defective paint job can be stripped with 100 parts of a solution containing 50 to 99 parts of sulfuric acid, from about 0.1 to 10 parts of a surfactant and from about 0.9 to 49.9 parts of water. The stripped part can be effectively repainted with polyurethane enamel provided that the stripped part is not subjected to the normal pretreatment required in painting EPDM parts.

6 Claims, No Drawings

METHOD OF STRIPPING AND REPAINTING ETHYLENE-PROPYLENE-NON-CONJUGATED-DIENE RUBBER PARTS

This is a continuation of application Ser. No. 621,721, filed Oct. 14, 1975, now abandoned.

BACKGROUND OF THE INVENTION

1. Field of the Invention

Paint is stripped from EPDM parts and the parts are repainted with polyurethane enamel ommiting the normally required pretreatment.

2. Description of the Prior Art

In order to prevent damage to automobiles, many metal parts of automobiles most likely to be subject to impact, have been replaced by EPDM rubber parts. The EPDM parts are painted to match the color of the automobile. Getting paint to stick to the ethylene-propylene-non-conjugated-diene terpolymer known as EPDM and to produce an esthetically pleasing coating has historically been a problem. Possibly the best method of obtaining a good paint job most of the time is to coat the EPDM surface with 1.4 miligrams of benzophenone per square inch then treat the coated surface with ultraviolet light. Unfortunately many parts having too much paint buildup or not passing rigorous testing were produced using the best method. Attempts at stripping the paint from the defective parts, recoating with benzophenone, retreating with ultraviolet light, and repainting the parts were unsuccessful.

SUMMARY OF THE INVENTION

It was discovered that if the defectively painted EPDM parts were stripped with 100 parts of a solution containing 50 to 99 parts of a sulfuric acid, 1 to 10 parts of a surfactant and 0 to 40 parts of water and if the pretreatment step of the stripped parts was omitted, the parts could be successfully repainted.

DESCRIPTION OF THE PREFERRED EMBODIMENTS

Painted EPDM automobile body parts can be stripped of the defective paint and repainted using the following procedure:

The parts are immersed in 100 parts of a solution at 100° to 140° F. for from about 10 to 40 minutes, the solution comprising:

1. from about 50 to 99 parts of sulfuric acid.
2. from about 0.1 to 10.0 parts of a surfactant.
3. from about 0.9 to 49.9 parts of solvent.

The parts are then removed from the solution and rinsed with water. All fragments of paint that adhere to the surface are removed with a soft brush. The parts are then repainted omitting the conventional benzophenone coating and omitting the conventional ultraviolet light treatment of the benzophenone coated parts.

If the stripped parts are subjected to benzophenone coating and the ultraviolet light treatment, and then painted, water will cause the paint to come loose from the parts.

A stripping solution used in the practice of the present invention is commercially available from Amchem Products, Inc., Ambler, Pennsylvania, 19002. The product is known as Amchem CS-73-M408. An analysis of the product shows it contains about 68.5 parts of sulfuric acid, and about 0.75 parts of a surfactant which appears to be a polyethylene oxide ester of a fatty acid. The remainder of the product is probably water. Preferably the stripping solution contains from 60 to 80 parts of sulfuric acid, 0.5 to 1.5 parts of surfactant and 18.5 to 39.5 parts of water.

The essential ingredient in the paint stripping solution is sulfuric acid. It is the sulfuric acid which removes the polyurethane enamel from the EPDM parts. The surfactant is also important in that it disperses the paint removed from the part but the specific surfactant of the Amchem stripper is not critical. Other surfactants which can be used include dodecyl benzene sulfonate, the sodium salt of dodecyl sulfonate, the sodium salt of disisopropylnaphthylene sulfonate, polyoxyethylene thioether which is the reaction product of dodecyl mercaptan and ethylene oxide and polyoxyethylene lauryl ether.

The solvent used is preferably water. The presence of organic solvents is not preferred because of the air pollution generated upon drying of the stripped parts. When making paint stripper solutions containing 80 parts or more sulfuric acid, it is preferable that the ingredients be mixed at 32° F. or colder to prevent degradation of the surfactant by the sulfuric acid.

In the following examples as elsewhere in the specification all parts are by weight.

EXAMPLE I

Parts whose paint jobs failed to meet purchasers' standards were immersed for 25 minutes in a 145° F. solution of Amchem CS-47- M408 paint stripper. This material is commercially available from Amchem Inc. The stripper was analyzed to contain 68.5 parts of sulfuric acid, 0.75 parts of polyoxyethylene ester of a fatty acid as a surfactant and 29.75 parts solvent. The solvent is primarily or totally water. The parts were then removed from the stripper rinsed with water, and paint that still adhered to the surface was removed with a soft brush. The parts were then dried and repainted with polyurethane enamel. The repainted parts with few exceptions met automobile manufactures' specifications.

EXAMPLE II

Example I was repeated except that the normal procedure of coating the parts with benzophenone then subjecting the parts to ultraviolet light treatment was employed. The parts generally failed the water immersion test. This test shows that water causes the paint to peel off of the parts.

EXAMPLE III

Example I was repeated using a stripper containing 65 parts sulfuric acid, 0.7 parts of a polyoxyethylene ester of a fatty acid as a surfactant and 34.3 parts of water. All other conditions of Example I remained the same, except that the time of immersion was 35 minutes because the more dilute stripper solution took noticeably longer to remove the polyurethane enamel. The final parts produced were of the same high quality as Example I.

EXAMPLE IV

Example I was repeated except that the stripper contained 71 parts sulfuric acid, 0.8 parts of the surfactant and 28.2 parts of water. The results were comparable to Example I.

I claim:
1. A method of removing paint from and repainting ultra violet light-benzophenone treated ethylene-propy- lene-non-conjugated diene rubber parts consisting essentially of:
A. immersing the parts in 100 parts of a solution consisting essentially of:
   (a) from about 50 to 99 parts of sulfuric acid
   (b) from about 0.1 parts to 10 parts of a surfactant
   (c) from about 0.9 to 40 parts of water
B. maintaining the parts in the solution at a temperature of 100° F. to 200° F. for from 10 to 40 minutes
C. removing the parts from the solution
D. rinsing the solution from the parts with water
E. drying the parts
F. repainting the parts in the absence of an ultra violet light benzophenone treatment after the immersion.

2. The process of claim 1 wherein the surfactant is a polyoxyalkylene ester of a fatty acid.

3. The process of claim 1 wherein the temperature of the solution is from 140° F. to 150° F.

4. The process of claim 1 wherein the parts are immersed for from 20 to 30 minutes.

5. The process of claim 1 wherein the solution contains
   (a) 6 parts to 80 parts sulfuric acid
   (b) 0.5 to 1.5 parts of a surfactant, and
   (c) 18.5 to 39.5 parts of water.

6. The process of claim 1 wherein loose particles of paint are removed from the surface of the parts after the parts have been rinsed with water.

* * * * *